United States Patent [19]

Magenheimer

[11] Patent Number: 5,921,402
[45] Date of Patent: Jul. 13, 1999

[54] CABLE MANAGEMENT TRACK SYSTEM

[75] Inventor: Edward F. Magenheimer, Doylestown, Pa.

[73] Assignee: Systems Manufacturing Corporation, Conklin, N.Y.

[21] Appl. No.: 09/067,758

[22] Filed: Apr. 27, 1998

[51] Int. Cl.⁶ .................................................. A47F 5/00
[52] U.S. Cl. ..................... 211/26; 211/94.01; 248/49; 361/826; 361/829
[58] Field of Search ..................... 248/49, 68.1, 65, 248/51, 52, 279.1; 211/26, 26.2, 94.01; 361/826, 829

[56] References Cited

U.S. PATENT DOCUMENTS

| | | | |
|---|---|---|---|
| 1,764,630 | 8/1930 | Houts | 248/49 |
| 5,240,209 | 8/1993 | Kutsch | 248/49 |
| 5,765,698 | 6/1998 | Bullvant | 211/26 |
| 5,788,087 | 8/1998 | Orlando | 211/26 |
| 5,839,702 | 11/1998 | Jette | 248/49 |

*Primary Examiner*—Ramon O. Ramirez
*Attorney, Agent, or Firm*—Salzman & Levy

[57] ABSTRACT

A cable and wire management track for accommodating large cable runs. The computer system has a plurality of peripheral components, such as a monitor, keyboard, printer, mouse, speakers, routers, bridges, switches, modems, etc. The cable and wire management track mounts to a wall, rack or enclosure, and has a plurality of hangers for receiving the wires issuing from the components. The hangers are mounted for sliding and rotative indexing upon the track, and are easily positioned behind each peripheral unit in order to receive and store its cables and wires.

15 Claims, 3 Drawing Sheets

CABLE MANAGEMENT TRACK SYSTEM

FIELD OF THE INVENTION

The present invention relates to computer systems and, more particularly, to a device for managing the cables and wires of a computer and associated peripheral components.

BACKGROUND OF THE INVENTION

In the past, the average home or business computer system comprised only a few components and peripherals, such as a CPU module, a monitor, a keyboard, and a printer.

In more recent times, personal computer systems have grown more complex. For example, an average computer system may now consist of many peripheral components, including a monitor, a scanner, a keyboard, a telefax, a printer, a microphone, one or more speakers, a hard drive back-up unit, a mouse, a plotter, a videocam, a camera; and in complex large-scale systems, modems, routers, bridges, switches, power supplies and so forth.

These present day computer systems have many wires running between the main CPU module and the peripherals. The resulting connections present a daunting and unwieldy tangle of wires.

In addition to being unsightly, these tangles also present difficulties when the system requires modification. Rearranging the components often requires disconnecting all of the wires, and then reconnecting them. Many times, one is forced to unthread several wires in order to locate just one improperly connected wire.

As one of its objectives, the present invention has to provide a device for neatly arranging the various cables and wires from computer to computer as well as to its peripheral components.

The cable management device of this invention is designed to fit different electronic enclosures such as racks, computer mainframe enclosures, network enclosures or the like. It may also be attached to a surface such as a wall of a structure. The device comprises a mountable track, similar to a lighting track, that supports a plurality of wire hangers. Each of the wire hangers is slidable along the track, so that each can be positioned at a desired cable break-out point. Each wire hanger is rotatively indexable upon its slidable mounting bracket. The wire hangers have a versatile, two-dimensional movement, which provides ease of routing different sized wire and cables. The system allows for easy cabling changes within an equipment cabinet.

SUMMARY OF THE INVENTION

In accordance with the present invention, there is provided a cable management device for a computer and its peripheral components. The cable management device comprises a track that mounts to a wall, rack or enclosure behind the computer system elements. The track has slidable brackets disposed therein, for longitudinal movement along the track. Each slidable bracket supports a cable or wire hanger. Each hanger is rotatively indexable about its respective bracket. The slidable brackets and rotative hangers combine to provide a two-dimensional movement. This allows for precise positioning of the hangers in order to accommodate the wires and cables emanating from the peripheral components of the computer system. The hangers are different in size to adapt to different thicknesses of cables or wires. Each hanger has a serpentine-shaped frame that facilitates the loading and unloading of the cables and wires thereupon.

It is one of the objects of the invention to provide an improved system for managing the wiring and cabling of a computer system and its peripheral components.

It is another object of this invention to provide a wiring and cabling system that has wire hangers for routing the wires and cables thereupon.

It is a further object of the invention to provide a wire management track that mounts to a wall, rack or enclosure disposed behind a computer system and its peripherals, and which comprises wire and cable hangers that are movable in two dimensions.

BRIEF DESCRIPTION OF THE DRAWINGS

A complete understanding of the present invention may be obtained by reference to the accompanying drawings, when considered in conjunction with the subsequent detailed description, in which.

For purposes of brevity and clarity, like elements and components will bear the same designation throughout the figures.

DESCRIPTION OF THE PREFERRED EMBODIMENT

Generally speaking, the invention features a cable and wire management track for mounting behind a computer system having a plurality of peripheral components, such as a monitor, keyboard, printer, mouse, speakers, routers, bridges, switches, modems, etc. The cable and wire management track mounts to a wall, rack or enclosure in back of the computer and its peripherals, and has a plurality of hooks for receiving the wires issuing from the components. The hooks are mounted for sliding and rotative indexing upon the track, so that the hooks are easily positioned behind each peripheral unit in order to receive and store each cable and wire.

Figure 1:
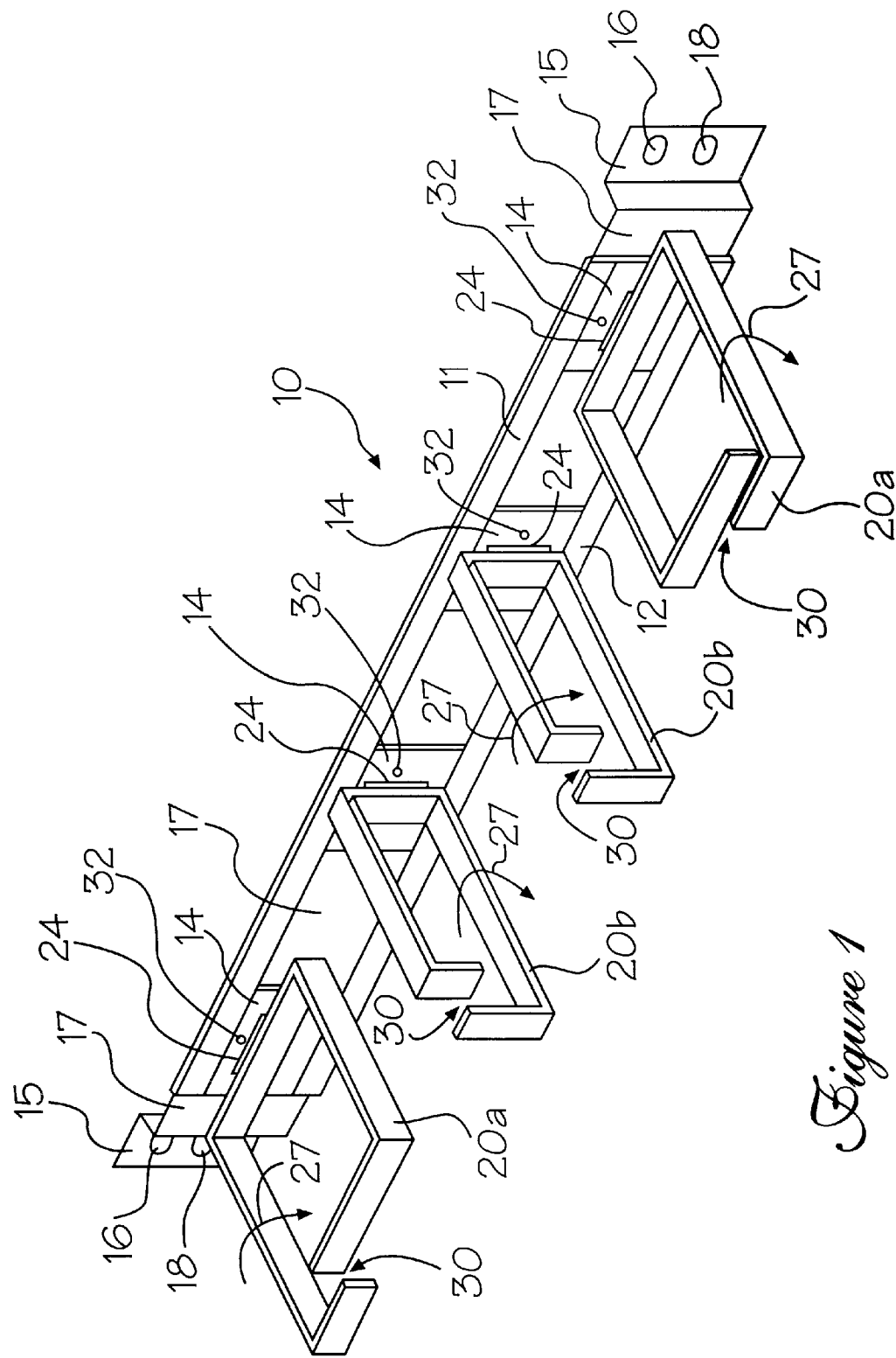
FIG. 1 illustrates a perspective view of the cable and wire management track device of this invention.

Now referring to FIG. 1, the cable and wire management track 10 of this invention is shown. The track 10 comprises a pair of elongated upper and lower rails 11 and 12, respectively disposed upon elongated member 17. The rails 11 and 12 support a number of rectangular brackets 14 for sliding or translational movement, as will be explained hereinafter with reference to FIG. 4. The elongated member 17 has right angle flanges 15 disposed on distal ends thereof. The flanges 15 each have a pair of holes 16 and 18, respectively, for mounting the track to a wall behind a computer system, or to a rack or enclosure, either to the frame or set of rack mount rails (not shown).

Figure 3:
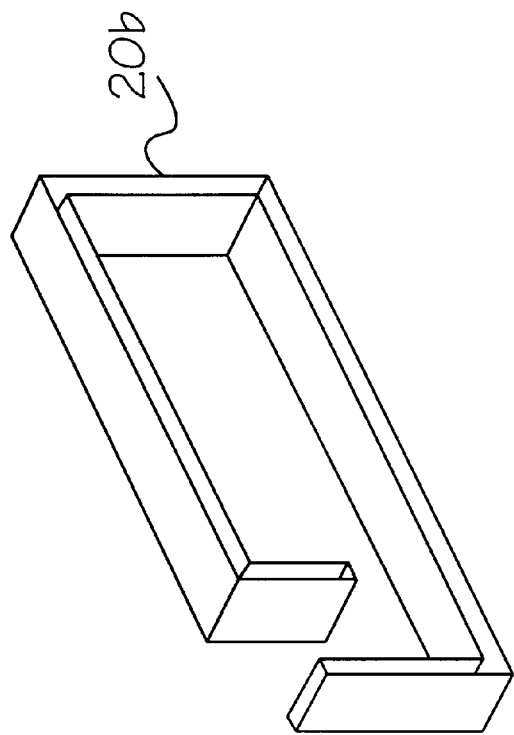
FIG. 3 shows a perspective, enlarged view of a small hook supported upon the track device shown in FIG. 1.
Figure 2:
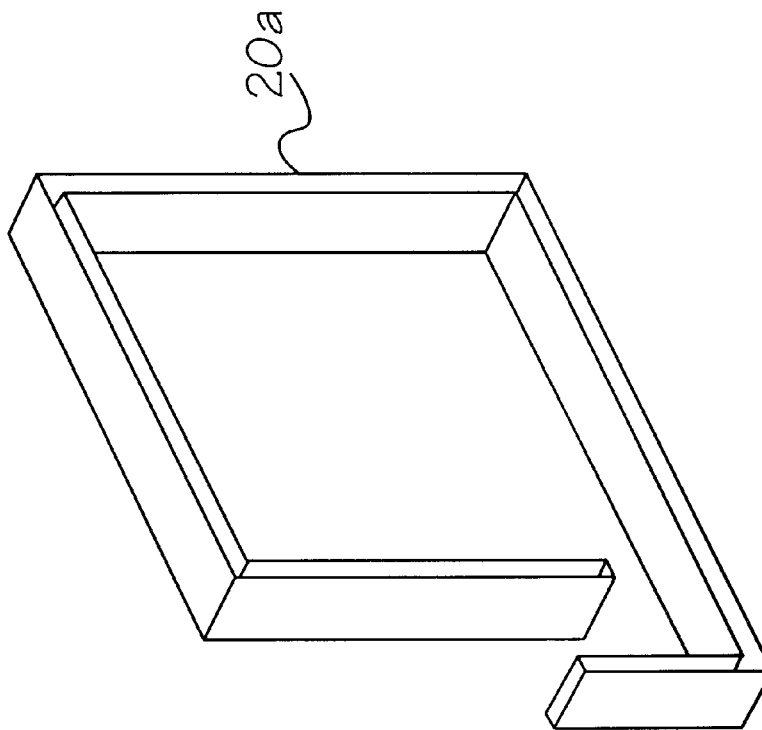
FIG. 2 depicts a perspective, enlarged view of a large hook carried by the track device shown in FIG. 1.

Each bracket 14 supports a serpentine hanger or hook member. The hook member can be either a large rectangular hook 20a, or a small rectangular hook 20b, as further illustrated in enlarged view in respective FIGS. 2 and 3.

Each hook member 20a or 20b is secured to its respective bracket 14 (arrows 27), by a block 24. Each block 24 is attached to its respective bracket 14 (not shown). The shape of the bracket 14 allows each hook 20a and 20b to index to ninety, one hundred-eighty, two hundred-seventy, and three hundred-sixty degree stations.

Figure 4:
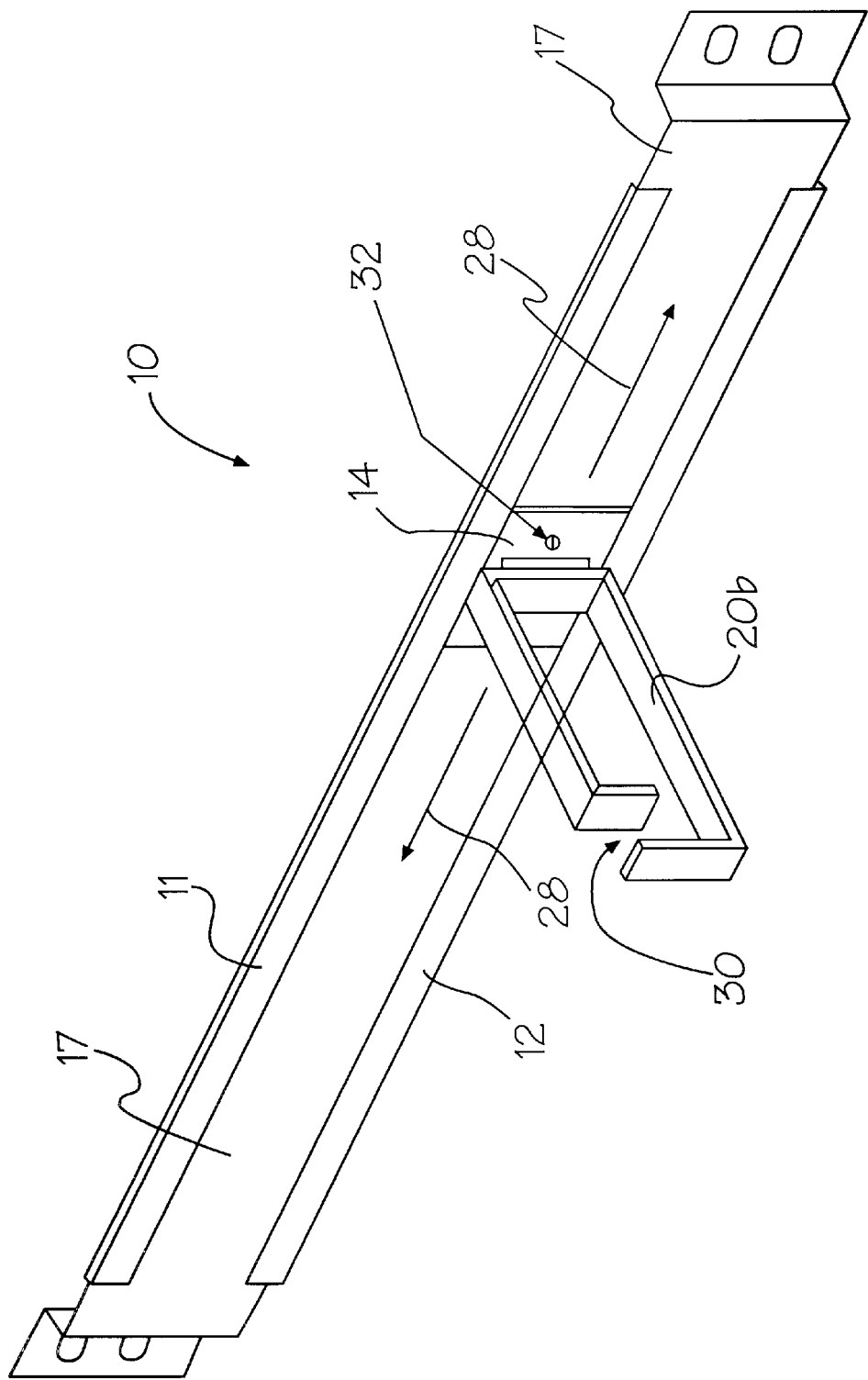
FIG. 4 illustrates a perspective view of the track device depicted in FIG. 1, with a bracket supporting the hook shown in FIG. 3 being moved laterally along the length of the track device.

Referring to FIG. 4, a typical, small hook 20b is shown for illustrative purposes only. The bracket 14 supporting the hook 20b is shown sliding (arrows 28) upon the elongate member 17, by virtue of the support rails 11 and 12, respectively. All of the hooks 20a and 20b can slide or translate upon the elongate member 17. Each hook 20a and 20b is slidable upon the elongate member 17 in either direction (i.e., either to the left or to the right). In this manner, each hook 20a and 20b can be positioned along the track 10 opposite a desired peripheral or computer module unit. The cables or wires emanating from each peripheral component can be placed into each hook on the inside providing cable routing horizontally or vertically. The openings 30 in each hook member allow the wires to be easily loaded or unloaded.

Each bracket 14 comprises a set screw 32, by which the bracket 14 can be secured at any particular place along the elongated member 17, to which it can be slid.

It will be observed that the two-dimensional movement, (i.e., both rotative and translative) of each of the hooks 20a and 20b, respectively, about the elongate member 17, allows for a versatile positioning of the hooks behind a particular peripheral component, or cable run.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A cable and wire management device for a computer system having a number of peripheral components, comprising:
    an elongated track supporting a plurality of hanger members thereupon, said elongated track having means for mounting said elongated track to a wall, rack or enclosure, each hanger member having rotational means for rotatively supporting each hanger member upon said elongated track; and
    translational means disposed between said elongated track and each of said plurality of hanger members, for supporting said hanger members for translational movement upon said elongated track.

2. The cable and wire management device in accordance with claim 1, wherein said elongated track comprises a pair of respective upper and lower rails for supporting said translational means.

3. The cable and wire management device in accordance with claim 1, wherein said translational means comprises a plurality of sliding bracket members for translational movement upon said elongated track, and further wherein said elongated track comprises a pair of respective upper and lower rails for supporting said sliding bracket members for translational movement thereupon.

4. The cable and wire management device in accordance with claim 3, further comprising securing means disposed upon each sliding bracket for affixing each bracket in a given position upon said elongated track.

5. The cable and wire management device in accordance with claim 3, wherein each bracket is attached to a block which slides into said elongated track for either vertical or horizontal cable runs.

6. A cable and wire management device for a computer system having a number of peripheral components, comprising:
    an elongated track supporting a plurality of wire and cable support members thereupon, said elongated track having means for mounting said elongated track to a wall, rack or enclosure, each wire and cable support member of said plurality of wire and cable support members having ability to run vertically or horizontally, supporting each wire and cable support member upon said elongated track; and
    translational means disposed between said elongated track and each of said plurality of wire and cable support members for supporting said wire and cable support members for translational movement upon said elongated track.

7. The cable and wire management device in accordance with claim 6, wherein said elongated track comprises a pair of respective upper and lower rails for supporting said translational means.

8. The cable and wire management device in accordance with claim 6, wherein said translational means comprises a plurality of sliding bracket members for translational movement upon said elongated track, and further wherein said elongated track comprises a pair of respective upper and lower rails for supporting said sliding bracket members for translational movement thereupon.

9. The cable and wire management device in accordance with claim 8, further comprising securing means disposed upon each sliding bracket for affixing each bracket in a given position upon said elongated track.

10. The cable and wire management device in accordance with claim 8, wherein each bracket is supported upon a block, and further wherein each bracket can be placed in either a vertical or horizontal position within said elongated track.

11. A cable and wire management device for a computer system having a number of peripheral components, comprising an elongated track supporting a plurality of wire and cable support members thereupon, said elongated track having means for mounting said elongated track to a wall, rack or enclosure, each wire and cable support member of said plurality of wire and cable support members having both rotational and translational support means for rotatively and translatively supporting each wire and cable support member upon said elongated track.

12. The cable and wire management device in accordance with claim 11, wherein said elongated track comprises a pair of respective upper and lower rails for supporting said rotational and translational support means.

13. The cable and wire management device in accordance with claim 11, wherein said rotational and translational support means comprises a plurality of sliding bracket members for translational movement upon said elongated track, and further wherein said elongated track comprises a pair of respective upper and lower rails for supporting said sliding bracket members for translational movement thereupon.

14. The cable and wire management device in accordance with claim 13, further comprising securing means disposed upon each sliding bracket for affixing each bracket in a predetermined position upon said elongated track.

15. The cable and wire management device in accordance with claim 13, wherein each bracket is supported upon a block, and further wherein each bracket can be positioned either vertically or horizontally about said elongated track.

* * * * *